Figure 1:
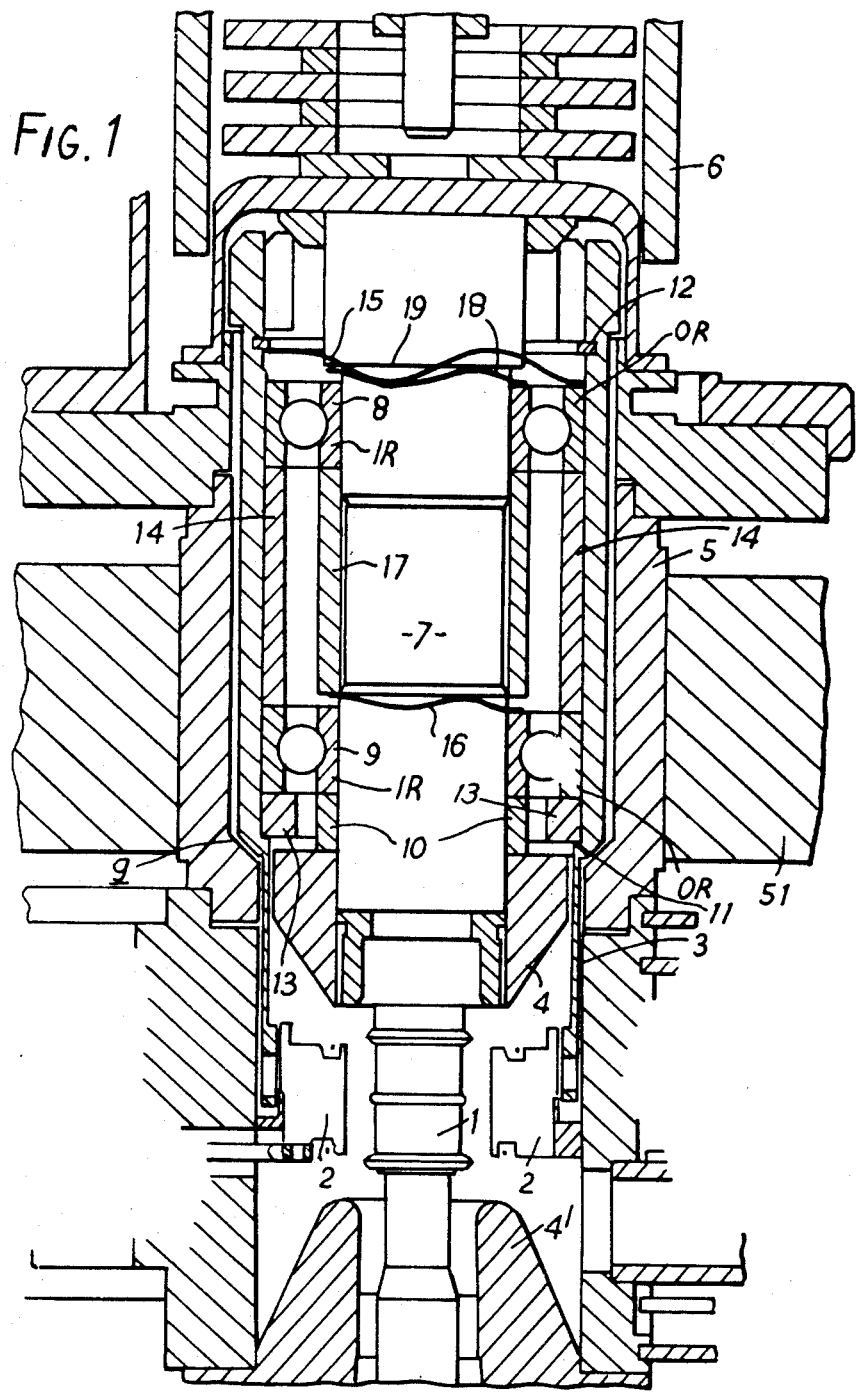

United States Patent [19]

Baker

[11] 4,281,273
[45] Jul. 28, 1981

[54] SPIN TUNED MAGNETRON HAVING LOAD SHARING BEARING ARRANGEMENTS

[75] Inventor: John E. Baker, London, England

[73] Assignee: E M I -Varian Limited, Hayes, England

[21] Appl. No.: 79,255

[22] Filed: Sep. 27, 1979

[30] Foreign Application Priority Data

Oct. 3, 1978 [GB] United Kingdom ............... 39026/78

[51] Int. Cl.³ ............................................. H01J 25/50
[52] U.S. Cl. ................................ 315/39.61; 315/39.51; 315/39.59
[58] Field of Search ................. 315/39.51, 39.59, 39.61

[56] References Cited

U.S. PATENT DOCUMENTS

| | | | |
|---|---|---|---|
| 2,559,506 | 7/1951 | Kurshan | 315/39.61 |
| 3,247,421 | 4/1966 | Backmark | 315/39.61 |
| 3,297,909 | 1/1967 | Foreman | 315/39.59 X |
| 3,379,925 | 4/1968 | Edwards | 315/39.59 |
| 3,414,761 | 12/1968 | Glenfield | 315/39.61 |
| 3,441,795 | 4/1969 | Hynes et al. | 315/39.61 |
| 4,143,300 | 3/1979 | Cutting et al. | 315/39.61 |

Primary Examiner—Saxfield Chatmon, Jr.
Attorney, Agent, or Firm—Fleit & Jacobson

[57] ABSTRACT

A spin tuned magnetron (FIG. 2) includes a spinner 3 which interacts with a magnetron cavity to modulate its frequency of oscillation. The spinner runs in bearings 8, 9 around a shaft 7. The lives of the bearings are a controlling factor in the life of the magnetron.

The outer races OR are fixed in position relative to each other and to the spinner by spacers, 13, 14 and a spring 15 arranged between an abutment 11 and a circlip 12 on the spinner. The inner races are arranged to be moveable relative to each other and to the shaft by virtue of spacers 10 and 17, a spring 16 between the inner races, and a further spring 18. A pole-piece nose 4 is arranged to be screwed down on the shaft to compress the springs 16 and 18 to provide a desired amount of axial float on the spinner. By setting the axial float the bearing load can be shared as desired and thus increase the lives of the bearings.

10 Claims, 4 Drawing Figures

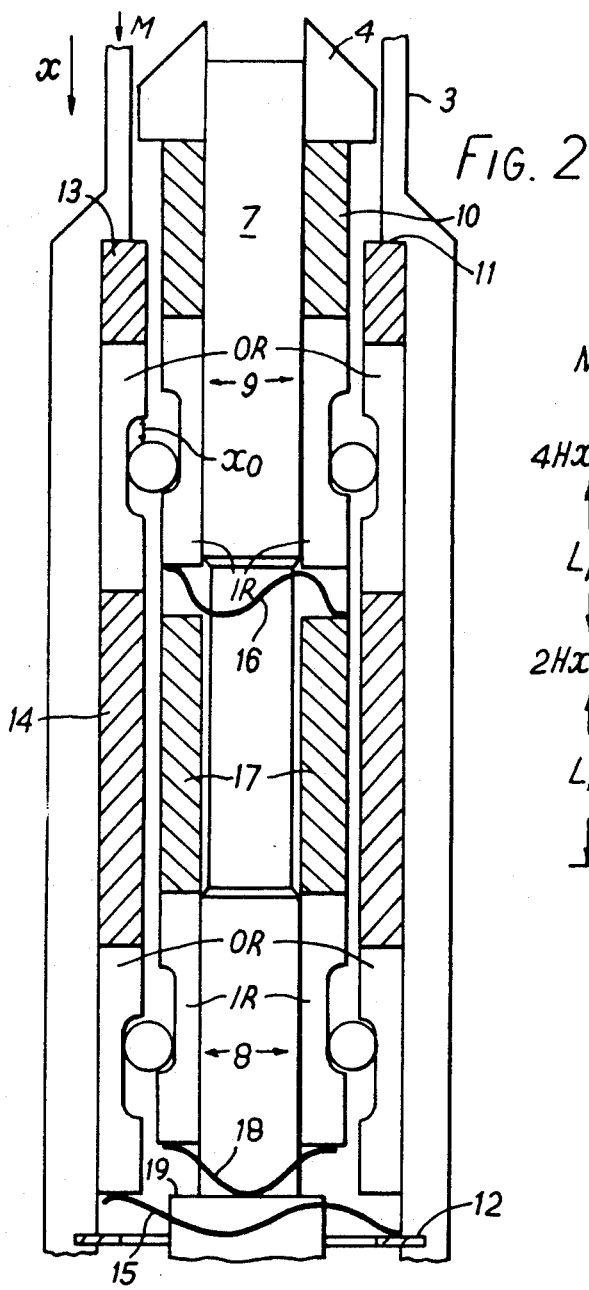
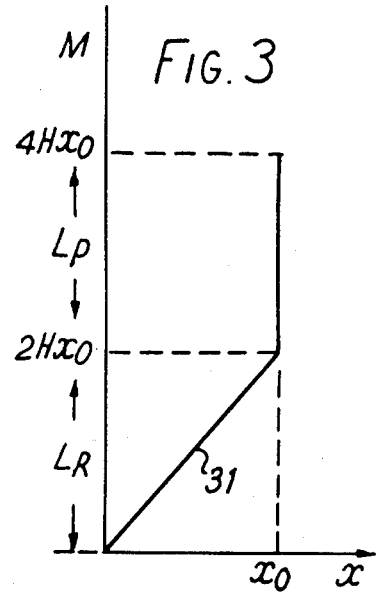
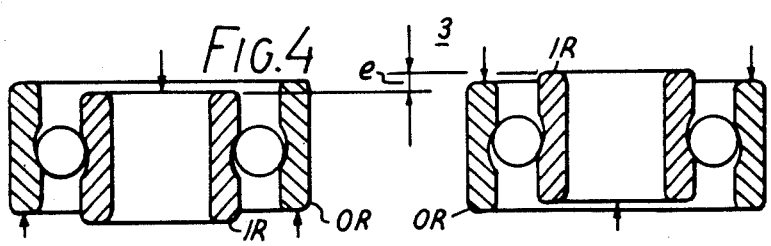

4,281,273

SPIN TUNED MAGNETRON HAVING LOAD SHARING BEARING ARRANGEMENTS

The present invention relates to a spin tuned magnetron.

A spin tuned magnetron comprises a magnetron cavity including a cathode and an anode structure. A spinner interacts with the anode structure to modulate the frequency of oscillation of the cavity. The spinner runs in bearings the lives of which are a controlling factor in the life of the magnetron.

It is an object of the present invention to provide a magnetron having a bearing arrangement in which mitigation of adverse factors affecting the life of the bearing arrangement can be achieved.

A spin tuned magnetron including:
a spinner assembly having a spinner member;
a shaft member coaxial with the spinner assembly and defining an axis of rotation relative to which the spinner member rotates;
rotor and pole piece bearing arrangements to allow the spinner member to rotate relative to the shaft member, the bearing arrangements being axially spaced apart, each bearing arrangement having an outer race associated with one of the members and an inner race associated with the other of the members;
means retaining the races associated with one of the members in fixed positions relative to that member and axially spaced apart relative to each other;
spacing means for maintaining the races associated with the other member in an axial spacing relationship with the said races associated with the said one of the members which is dependent on an axial load acting on the spinner member, the spacing means including first spring means arranged between, and axially urging apart the said races associated with the other member, and second spring means arranged at a side remote from the first spring means of one of the said races associated with the other member to oppose the said axial load, and
means for adjusting the positions of the said races associated with the other member relative to each other and to that member to preload the spring means and to adjust the end play in the bearing arrangements.

For a better understanding of the present invention, and to show how the same may be carried into effect, reference will now be made, by way of example to the accompanying drawings, in which:

FIG. 1 is an axial section through a spin-tuned magnetron incorporating the invention, FIG. 2 is a schematic diagram, not to scale, showing the spinner assembly of the magnetron with highly exaggerated plays in the bearings of the assembly, FIG. 3 is a graph illustrating the sharing of load between the bearings of the magnetron, and FIG. 4 shows end play in a bearing.

Referring to FIG. 1, a conventional magnetron cavity comprises a cathode 1, an anode structure 2, a spinner 3 which interacts with the anode structure to modulate the freuqency of oscillation of the cavity, and magnetic pole-piece noses 4 and 4'. The nose 4 is magnetically coupled via a gap g with a pole-piece 5 of a magnet 51. The nose 4' is the pole of the magnet 51 opposite to the pole coupled to the other nose 4.

The spinner 3 is magnetically coupled to a rotor 6 to be rotated thereby. The spinner rotates about a fixed shaft 7, there being a rotor bearing 8 and a pole-piece bearing 9 between the spinner and the shaft. Each bearing comprises an outer race OR and an inner race IR and a singler row of balls.

The lives of the bearings 8 and 9 are a controlling factor in the life of a magnetron.

The adverse factors affecting the lives of the bearings include, inter alia, distortion of the bearings by grinding key ways in them, tilt of the races relative to one another, and uneven loading of the bearings.

The example of the invention shown in FIGS. 1 and 2 is arranged to mitigate these adverse factors in the following manner:

The pole-piece nose 4 is screwed to the shaft 7. The outer races OR of the bearings 8 and 9 are positioned between a shoulder 11 on the spinner 3 and a circlip 12 which fits in an internal groove in the spinner. The outer races or one maintained in position by outer spacers 13 and 14 and another spring 15. The inner races IR are positioned by an inner spacer 10 which spaces the bearing 9 from the nose 4, an inner spring 16, a further inner spacer 17 between the spring 16 and the bearing 8, and a further inner spring 18 between the bearing 8 and a shoulder 19 on the shaft 7. The springs 16 and 18 are identical.

Thus, the inner races of the bearings 8 and 9 are free to move on the shaft subject to the constraints of the spacers and springs, and the need for key ways is eliminated. The outer spacers 13 and 14 are accurately ground with parallel faces to minimise the tilt between the races.

The spinner 3 is subject to an axial load produced by the magnetic pull of the rotor 6 on it. The springs allow the distribution of this axial load between the bearings to be varied by changing the spacing between the races. It has been found that it is important to equalise, at least to a practical extent, the load on the two bearings at the operating temperature of the magnetron. This equalisation is achieved by choosing, when the magnetron is cold, a spacing $x_o$ between the races which produces equalisation of the load when the magnetron is at its operating temperature. This will be described in detail hereinafter.

The reasons for achieving the equalised loading include:
(1) The mean life of a bearing is thought to be proportional to the inverse cube of the load on it.
(2) The rate of heat conduction through an unloaded bearing is less than that of a loaded bearing. The bearing 9 is near to the magnetron cavity and gets hot. If this bearing were unloaded, the temperature distribution of the spinner would be affected and alter the spacing between the races due to differential thermal expansion between the shaft 7 which may be of molybdenum and the pole-piece nose 4 inner races and the inner spacers which may be of steel. This could alter the radial play in the bearing 9 which is especially undesirable in view of the small clearance between the spinner 3 and the pole piece 5 and the nose 4. Side float in the spinner causes the clearance to become asymmetrical producing a large radial component of magnetic attraction between the spinner and the pole-piece. The resultant radial force on the bearing 9 would be large causing early failure. Furthermore the relatively cold bearing 8 would act as a fulcrum allowing radial impulsive forces to act on the bearing 9 causing failure.

One method of setting the race spacing for load sharing is described as follows referring to FIG. 2.

The bearings 8 and 9 and the spacers 10, 13, 14, 17 are assembled into the spinner 3 and the outer spring 15 compressed until the circlip 12 is held in its groove. The outer spring 15 is highly compressed and holds the faces of the outer races OR firmly against their respective spacers 13, 14.

The assembly is then mounted on the shaft 7 and the pole-piece nose is screwed down until the axial float of the spinner is near maximum. At this point the spacers and pole-piece nose have compressed the inner springs 18 and 16 and thus preloaded them so that the faces of the inner and outer races have equal separation. The axial float of the spinner is then the end play (e) of each race.

The end play of a bearing is defined in FIG. 4. Referring to that Figure, to measure the end play (e), the outer race is held and the inner race is lightly loaded. The end play (e) reaches a stop when all the balls are in contact with both the inner and outer races. The load is then reversed and the distance the inner race moves before it again reaches a stop is defined as the end play (e).

The pole-piece nose 4 is now screwed further in, and so shortens the length of each inner spring 16, 18 by an amount $x_o$. The axial float of the spinner is thus reduced to $(e-x_o)$. In this situation one end stop for the axial float of the spinner would then occur when one race is pushed against its stop, though the other race would then still have an axial clearance $x_o$.

In practice the axial float is measured by the standing the spinner assembly with its axis vertical and bearing 9 above bearing 8 as shown in FIG. 2. A clock with a very light load is held against the open end of the spinner 3 so that only the weight of the spinner causes the bearing 8 to reach its stop as shown in FIG. 2. The spinner is then lifted as far as possible and the movement observed on the clock is the measured axial float of the spinner. The pole-piece nose 4 is adjusted to give desired axial float.

This method of setting the spinner assembly determines the way the load applied to the spinner is divided between bearings 8 and 9.

With no load on the spinner assembly, set vertically as above, the rotor bearing 8 has no play left but the outer race of bearing 9 can still move a distance $x_o$ before it can be loaded. FIG. 2 shows the magnetron in this situation.

Then if a small load M (representing the pull of the rotor 6 on the spinner 3) is placed on the end of the spinner this load is transmitted through the rotor bearing 8 onto the lower inner spring 18. As the inner race of the rotor bearing 8 is held between the two springs 18 and 16, the spring forces of which are in equilibrium, the small extra load M will cause the inner race to move down the shaft a small distance x, say, compressing the lower inner spring 18 slightly and expanding the upper inner spring 16 slightly. The change of distance with load is equivalent to the change in length with load of a spring with a Hookes constant twice the Hookes constant H of a single inner spring.

For a light load M, less than $2Hx_o$, the approximate bearing loadings are, for cold conditions, $$\begin{array}{ll}\text{rotor bearing 8 load} & L_R = 2Hx = M \\ \text{pole-piece bearing 9 load} & L_P = 0 \\ \text{and} & x < x_o\end{array} \Bigg) \quad (1)$$

Increasing the load M, the spinner will move relative to the shaft a distance $x = x_o$ before the pole-piece bearing 9 has its end play taken up. This is shown by line 31 in FIG. 3. For a load M greater than $2Hx_o$ the approximate loadings are, for cold conditions.

$$\begin{array}{l}L_R = 2Hx_o \\ \text{and } L_P = M - 2Hx_o\end{array} \Bigg) \quad (2)$$

For such a load, the compression of both springs is encountered and they cannot be compressed by a force less than their preload compression. Therefore even by increasing the load above the value $M = 2Hx_o$ the bearing 9 cannot move until the full compression of both the inner springs (about 1 kilogram) has been reached. Therefore the pole-piece bearing 9 takes the increased load but the spinner 3 does not move.

However, the value of $x_o$ is small by comparison with the length of the spacers separating the bearings, and, as stated hereinbefore, the temperature of the bearings affects $x_o$.

Equations 2 should therefore be modified to read, $$\begin{array}{l}L_R = 2H(x_o + \alpha T) \\ L_P = M - 2H(x_o + \alpha T)\end{array} \Bigg) \quad (3)$$

(These loadings are, again, only approximate).

For the assembly $\alpha \approx 0.1$ micron per °C. and for a typical operating temperature of 250° C. $\alpha T = 25$ microns and is of the same order as $x_o$.

In order to equalise the loads $L_R$ and $L_P$ for the operating temperature of magnetron $x_o$ is approximately given by:

$$x_o = (M/4H) - \alpha T \quad (4)$$

The setting of the end float is difficult because of the small movements involved: they may be about 25 microns for example which equals 0.001". An alternative method of achieving this is by measuring the load as a function of spinner movement relative to the shaft on for example an Instron Tester. The instrument has a pressure transducer to measure the load applied as a plan surface is moved at uniform speed towards a plate on which the spinner assembly is mounted with its axis vertical. The speed of movement is 500 microns per minute, the minimum available from the instrument, and the resultant load is measured on a chart recorder calibrated to give full scale deflection for 500 grams. As the plane surface moves the spinner 3 relative to the spinner shaft 7, movement takes place until the pole-piece bearing 9 comes in contact. Then the load will increase with no movement of the spinner 3. The point of the curve where this change of slope takes place indicates the load which will be applied to the bearing R. it is to be appreciated that, in the foregoing, the magnetron is set up so that the load on the spinner always pulls it towards the rotor 6. However, the magnetron could be set up so that the load pulls the spinner away from the rotor. In either case, the load varies rapidly with the size of the gap g between the spinner 3 and the pole-piece 5 so that g has to be set to close limits.

What we claim is:

1. A spin tuned magnetron including:
   a spinner assembly having a spinner member;
   a shaft member coaxial with the spinner assembly and defining an axis of rotation relative to which the spinner member rotates;
   rotor and pole piece bearing arrangements to allow the spinner member to rotate relative to the shaft member, the bearing arrangements being axially spaced apart, each bearing arrangement having an outer race associated with one of the members and an inner race associated with the other of the members;

means retaining the races associated with one of the members in fixed positions relative to that member and axially spaced apart relative to each other;

spacing means for maintaining the races associated with the other member in an axial spacing relationship with the said races associated with the said one of the members which is dependent on an axial load acting on the spinner member, the spacing means including first spring means arranged between, and axially urging apart the said races associated with the other member, and second spring means arranged at a side remote from the first spring means of one of the said races associated with the other member to oppose the said axial load, and means for adjusting the positions of the said races associated with the other member relative to each other and to that member to preload the spring means and to adjust the end play in the bearing arrangements.

2. A magnetron according to claim 1, wherein the shaft member is a central shaft around which the spinner member rotates, and the inner races of the bearing arrangement are associated with the central shaft and the outer races are associated with the spinner member.

3. A magnetron according to claim 2, wherein the retaining means comprises first and second axially spaced abutments on the spinner member, spacer members for maintaining the outer races in fixed positions relative to each other and to the first abutment, and a compression spring urging the spacer members and inner races towards the first abutment and away from the second abutment the second abutment constraining the spring.

4. A magnetron according to claim 2 or 3, wherein the central shaft has an abutment at that side of the rotor bearing arrangement remote from the pole piece bearing arrangement and the first spring means is a compression spring positioned between the inner races and the second spring means is a compression spring positioned between the inner race of the rotor bearing arrangement and the said abutment.

5. A magnetron according to claim 4, wherein the spacing means further includes a spacer member arranged between the inner races.

6. A magnetron according to claim 2, 3, 4 or 5, wherein the adjusting means comprises a pole-piece nose screwed to the shaft.

7. A spin tuned magnetron according to claim 4, wherein the adjusting means is so adjusted that when the spinner member is not subject to an axial load, there is an axial play in the bearing arrangements, the play being dependent on the Hookes constants of the first and second compression springs and a predetermined axial load on the spinner member, the springs having a predetermined compression.

8. A magnetron according to claim 7, wherein the said axial play equals $$e = (M/4H)$$

where
 $e$ = end play of the bearing arrangements
 $M$ = the said predetermined load
 $H$ = Hookes constant of the first and second springs.

9. A magnetron according to claim 7, wherein the said axial play equals $$e = (M/4H) + \alpha T$$

where
 $e$ = end play of the bearing arrangements
 $M$ = the said predetermined load
 $H$ = Hookes constant of the first and second springs
 $\alpha$ = coefficient of expansion of the pole piece bearing arrangement
 $T$ = operating temperature in degrees centigrade of the pole piece bearing arrangement.

10. A spin tuned magnetron comprising a spinner assembly having a cylindrical spinner member; a rotor for rotating the spinner member; a central shaft coaxial with the spinner member and defining an axis of rotation around which the spinner member rotates; a pole piece nose on the shaft; a pole piece bearing arrangement; a rotor bearing arrangement axially spaced from the pole piece bearing arrangement; each bearing arrangement comprising a single row of balls held between inner and outer races, the inner races being associated with the shaft and the outer races being associated with spinner member to allow the spinner member to rotate relative to the shaft; means retaining the outer races in fixed positions relative to one another and relative to the spinner member; and means spacing apart the inner races and resiliently maintaining them in positions relative to the outer races dependent on an axial load on the spinner member and including first and second substantially identical compression springs, the first spring being positioned between the inner races and the second spring means being positioned at that side of the rotor bearing arrangement remote from the pole piece nose to urge the inner races towards the pole piece nose, the pole piece nose being moveable relative to the shaft to adjust the positions on the shaft of the inner races relative to each other and relative to the shaft against the urging of the said springs, the pole piece nose being so adjusted as to apply to the springs a compression greater than a predetermined maximum value of axial load and produce an axial play in the bearing arrangements when there is no axial load on the spinner member, the play being dependent on the Hookes constant of the said springs and on a further predetermined value of load on the spinner member.

* * * * *